United States Patent [19]

Kavcic

[11] 4,329,818
[45] May 18, 1982

[54] BELT FOR A TROUGH BELT CLEANING APPARATUS

[75] Inventor: Marjan Kavcic, Metelen, Fed. Rep. of Germany

[73] Assignee: Schlick -roto-jet Maschinenbau GmbH, Metelen, Fed. Rep. of Germany

[21] Appl. No.: 130,140

[22] Filed: Mar. 13, 1980

[30] Foreign Application Priority Data

Mar. 14, 1979 [DE] Fed. Rep. of Germany ....... 2909893

[51] Int. Cl.³ .......................... B24C 3/10; B65G 17/06
[52] U.S. Cl. ......................................... 51/422; 198/850
[58] Field of Search ................. 51/418, 426, 422, 423; 198/844, 850, 851; 474/207, 218, 227

[56] References Cited

U.S. PATENT DOCUMENTS

| | | | |
|---|---|---|---|
| 2,303,984 | 12/1942 | Byers | 198/851 |
| 2,563,084 | 8/1951 | Turnbull | 51/426 |
| 3,202,266 | 8/1965 | Schmermund | 198/850 |
| 3,352,407 | 11/1967 | Wright | 198/851 |
| 3,691,690 | 9/1972 | Harper | 198/844 X |
| 3,921,792 | 11/1975 | Anderson | 198/851 |
| 3,985,224 | 10/1976 | Harvey | 198/851 |
| 4,114,467 | 9/1978 | Petershack | 198/851 |

FOREIGN PATENT DOCUMENTS

417800 10/1934 United Kingdom ................ 198/851

*Primary Examiner*—Nicholas P. Godici
*Attorney, Agent, or Firm*—Fitch, Even, Tabin, Flannery & Welsh

[57] ABSTRACT

A belt for a trough belt cleaning apparatus in which the objects or articles to be cleaned are tumbled within the trough of a rotating endless belt and subjected to the action of a blasting agent during their tumbling motion, to become cleaned thereby wherein said endless belt comprises cross bars having extending between them links of a resilient material, with the ends of said links having on either side thereof a partially open end eye each for receiving said cross bars and for facilitating replacement of a link without removing a cross bar, which end eyes fully or partially embrace the (associated) cross bar, and wherein the edges of the eyes are adapted to be expanded to the width of a cross bar under spring-back resilience.

7 Claims, 3 Drawing Figures

BELT FOR A TROUGH BELT CLEANING APPARATUS

The present invention relates to a belt for a trough cleaning apparatus in which the objects or articles to be cleaned are tumbled within the trough of a rotating endless belt and subjected to the action of a blasting agent during their tumbling motion, to become cleaned thereby.

Belts of this type are mostly formed of rubber material, and they are provided with perforations for the passage of the blasting agent into corresponding collecting chambers of the apparatus. However, it is disadvantageous in belts of this type that they can not be readily repaired and they are required to be replaced even though only relatively insignificant belt damage has occurred. The respective apparatus must in such case be kept at standstill for hours or even for days. In addition to the great expense for a new belt, the cost for providing a reserve machine and the cost for the personnel engaged in the repair work are quite substantial.

Further, it is known to produce belts for trough belt cleaning apparatus from individual links of steel sheet or molded parts. In such construction, material may enter the space between adjacent links, and these links are then apt to be damaged when they are returned into their linear position for travel along a straight path, and sometimes even the driving and guiding elements may be damaged. Likewise replacement of individual links of such belts or of the complete belt is expensive and subject to the abovementioned cost, especially in view of the fact that the complete belt has to be divided in the position of a link to be replaced, and reconnected and tensioned after the repair work. Still further, belts of this type are of great weight and expensive to manufacture.

Accordingly, it is the object of the present invention to provide belts for trough belt cleaning apparatus, which do not show the abovementioned drawbacks.

The individual links of the belt according to the invention lend themselves to be replaced without the requirement of pulling out cross rods and without the necessity of replacing the complete belt.

According to the present invention, this object is solved in that said endless belt comprises cross bars having extending between them links of a resilient material, with the ends of said links having on either side thereof a partially open end eye each for receiving said cross bars and for facilitating replacement of a link without removing a cross bar, which end eyes fully or partially embrace an associated cross bar, and wherein the edges of the eyes are adapted to be expanded to the width of a cross bar under spring-back resilience.

Thus, the belt links exhibit a self-locking feature relative to the cross rods without thereby affecting their movability relative to the rods; advantageously, the links are formed of rubber material or of a resilient plastics material with or without resilient metallic inserts (liners). In another embodiment of the present invention, the links may be formed of spring steel, and in such case the looping angle of the links is not essentially greater than 180° in order to facilitate assembling and disassembling thereof. When rubber or plastics material is used, the looping angle may advantageously range up to 270° or more.

Depending on the operation of the apparatus employing the belts, the edges of the eyes are formed either to provide for particularly easy mounting, or so as to provide an extremely high clamping force. These eyes may define outwardly opening wedge-shaped spaces (facilitated assembling) or, in order to increase the clamping force, form a corner at the edge located at the inner side in the mounted condition of the belt, with the inner face of said corner extending in parallel with the outer surface of the belt link. The ends of the cross bars form the pins of chains laterally embracing the belts and being tensioned and guided in well-known manner by sprockets or pulleys; in order to reduce the dimensions of the chains, the ends of the cross bars are preferably of smaller diameter than those portions of the cross bars to which the belt links are attached. The thus defined increased circumferential length of the cross bars in the region of the supporting links proper is effective to reduce deflection of the cross rods and to increase the clamping or retaining force of the links attached to the cross rods.

Below, an exemplary embodiment of the invention is explained in greater detail by referring to the enclosed drawings, wherein.

Figure 1:
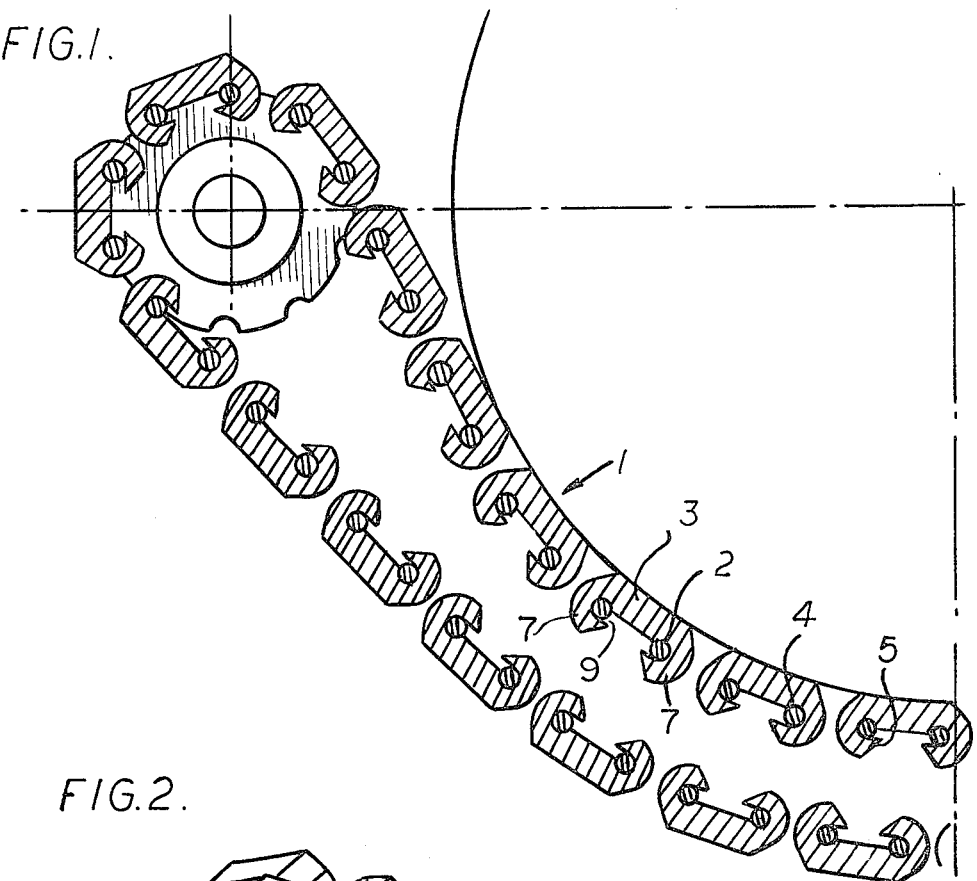
FIG. 1 is a schematical view of a belt according to the invention in the upper returning or rerouting portion thereof.
Figure 2:
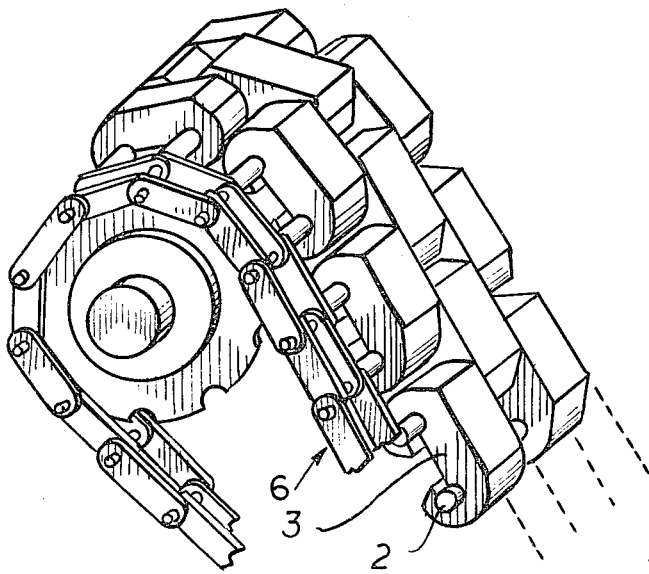
FIG. 2 is a part perspective view of a belt according to the invention including a lateral edge bounding chain.

As shown in the Figures, the belt 1 for trough cleaning systems or for trough belt blasting systems according to the invention comprises separate belt links 3, each link interconnecting (a pair of) cross bars 2 which are positioned in parallel with each other. The cross bars 2 are spaced from each other at a distance equal to the distance between end eyes 7 of the belt links 3; in the longitudinal direction of the cross bars 2, the belt links 3 define spacings corresponding to the width of a link 3, such that the respectively leading series of links of the trailing cross bar is each positioned in the gaps between the links of the trailing series of belt links.

In their outer portions, i.e. on either side of the belt area as such, the cross bars 2 terminate in chains 6, with the cross bars forming the pins which interconnect the chain links. These portions of the cross bars are of smaller diameter than their portion where the belt links 3 are attached to them. The chains 6 on both sides are tensioned, guided and driven in wellknown manner by means of sprockets or pulleys. This aspect of the belts may be designed in accordance with the expert's choice, so that it need not be described in greater detail here.

The belt links 3 proper each include a pair of end eyes 7 through which the cross bars 2 pass and which are of such a configuration that the cross bars may be clampingly inserted into these eyes even in the mounted or assembled condition of the belt, without any further manipulation. Accordingly, damaged belt links may be removed, and a new link may be clampingly attached to the belt without using tools and with easy manipulation. Such replacement may be effected, for instance, in the vicinity of the front returning position which is particularly well accessible to the repair personnel.

It is within the scope of the invention to form the individual belt links, at least in the portion adjacent their end eyes 7, of a resilient material, and to design them so as to be adapted to be attached to the cross bars by snap fit action; in this case, looping angle and clamping force must be sufficient to also withstand the enormous loads in operation, while on the other hand providing for easy attachment of the links.

In the embodiment shown, the belt links are integrally formed of rubber material; alternatively, a plastics material or spring steel may be used, or these materials may be combined with each other. The end eyes 7 are provided with a slot 9 for radial insertion of the cross bars, which slot may be expanded under spring-back resilience to such extent that the cross bars can pass theretrough. The looping angle of the links with respect to each cross bar is at least 180°; however, this angle may also range to 270° or more.

Figure 3:
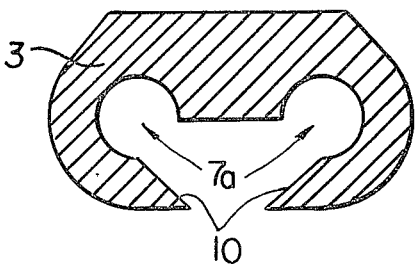
FIG. 3 is a side elevational view of a belt link showing an alternative configuration of the slot for inserting the cross bars.

As shown in FIG. 1, the corners of the edges 4 and 5 of the eyes 7 which are located on the inner side in the assembled belt, extend in parallel with respect to the outer surface of the belt links. In this way, a particularly high retaining or clamping force is secured. However, if the easy clamping attachment of the belt links (to the cross bars) is of primary importance, these corners or tips may define a wedge-shaped space 7a converging towards the inserted cross bar (FIG. 3). In this configuration, the ends of the inner faces extending in parallel with the outer surface are slightly chamfered or beveled at 10 on their cross bar sides.

It is absolutely surprising to the expert that belt links according to the invention are reliable in operation even under maximum load, e.g. with weights or loads of 1 ton and more, without sacrificing their handling in initial assembly or for repair. Considering the advantages of the subject matter of the invention, it may thus be spoken of an ideal solution to the existing problems.

What we claim is:

1. An endless belt for carrying objects through a blasting agent which passes through openings in the belt, said belt comprising:
    - a plurality of spaced parallel cross bars extending transversely of the belt from one side thereof to the opposite thereof, ends on said cross bars defining pins,
    - chain links secured to and spanning said pins to define therewith a driving chain for the belt,
    - belt links of resilient material extending between said cross bars and spaced from each other to define openings therebetween, said belt links being disposed in transversely adjacent rows across the width of the belt,
    - ends on said belt links having open-ended eyes receiving therein a cross bar,
    - each of said end eyes partially embracing its associated cross bar and thereby connecting its associated link to a cross bar,
    - edges of said end eyes defining a slot to be expanded to the width of a cross bar and to spring back when said cross bar is inserted into said end eye,
    - said end eyes being the only means to retain said belt links on said cross bars.

2. The belt according to claim 1, characterized in that said belt eyes have a looping angle greater than 180° and ranging up to 270°.

3. The belt according to claim 1 characterized in that said belt links are formed of rubber.

4. The belt according to claim 1, characterized in that at least the eyes are formed of spring steel, and that their looping angle is not substantially greater than 180°.

5. The belt according to any one of claims 1 characterized in that said edges of the eyes are beveled in a manner to define between them a wedge-shaped space converging toward the inserted cross bar.

6. The belt according to claim 1 characterized in that said edges of said eyes which are located on the inner side in the mounted condition of the belt, define corners the inner faces of which extend in parallel with the outer surfaces of the belt links.

7. The belt according to claim 1, characterized in that said ends on said cross bars are of smaller diameter than those portions of said cross bars to which said belt links are attached.

* * * * *